May 19, 1942.　　　H. E. MORTON　　　2,283,507
FLASH REMOVING MACHINE
Filed Sept. 21, 1939　　　7 Sheets-Sheet 3
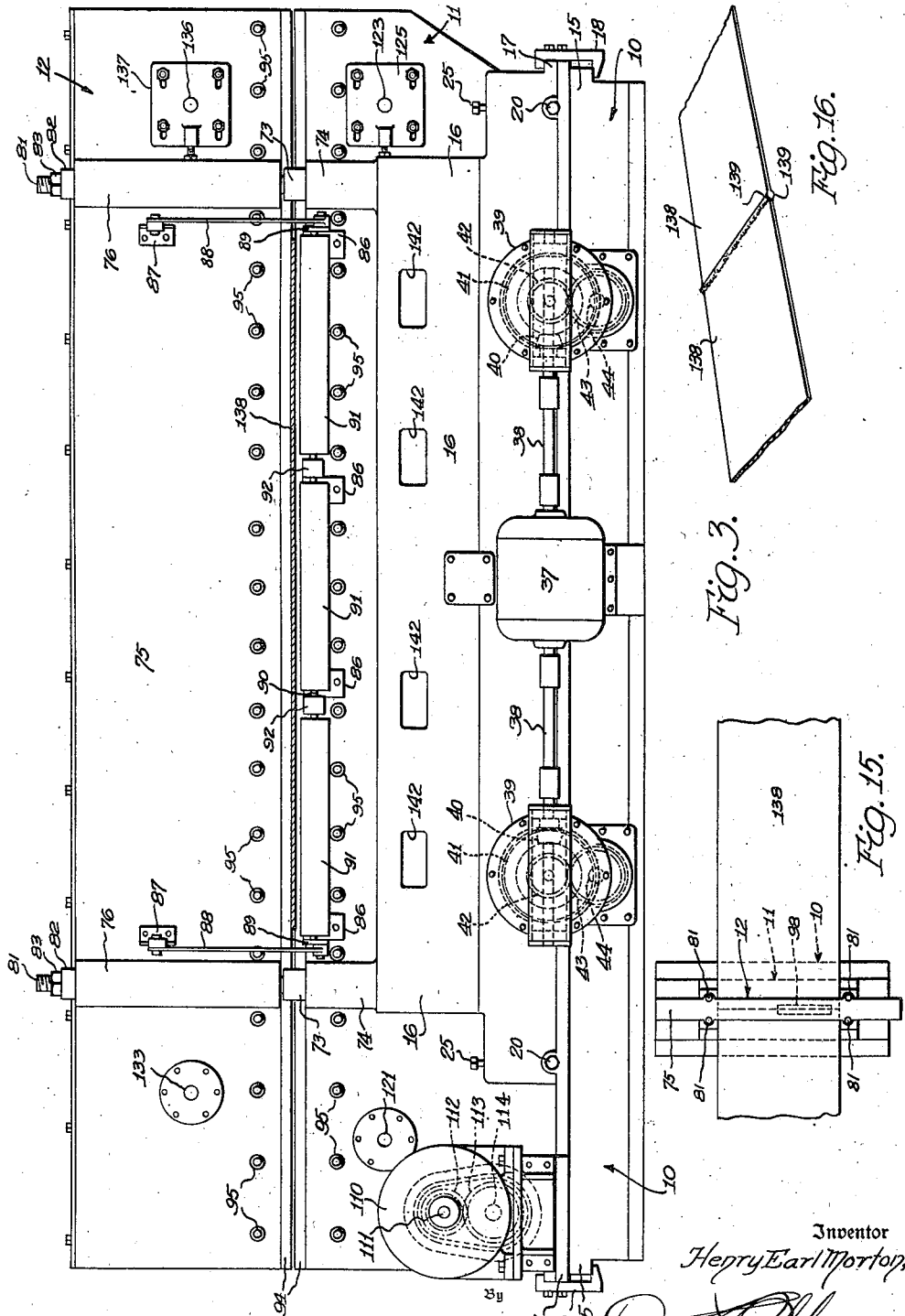

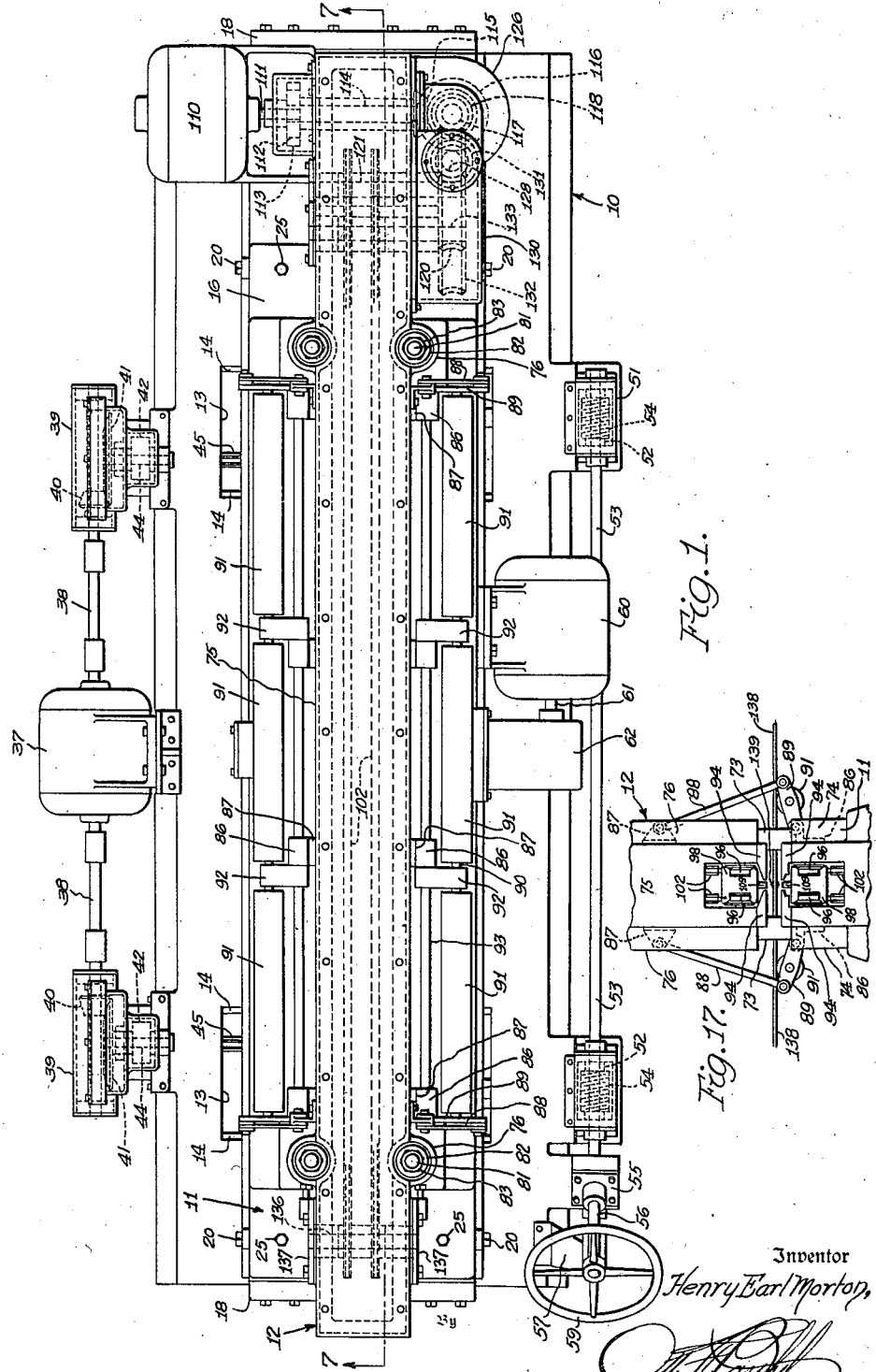

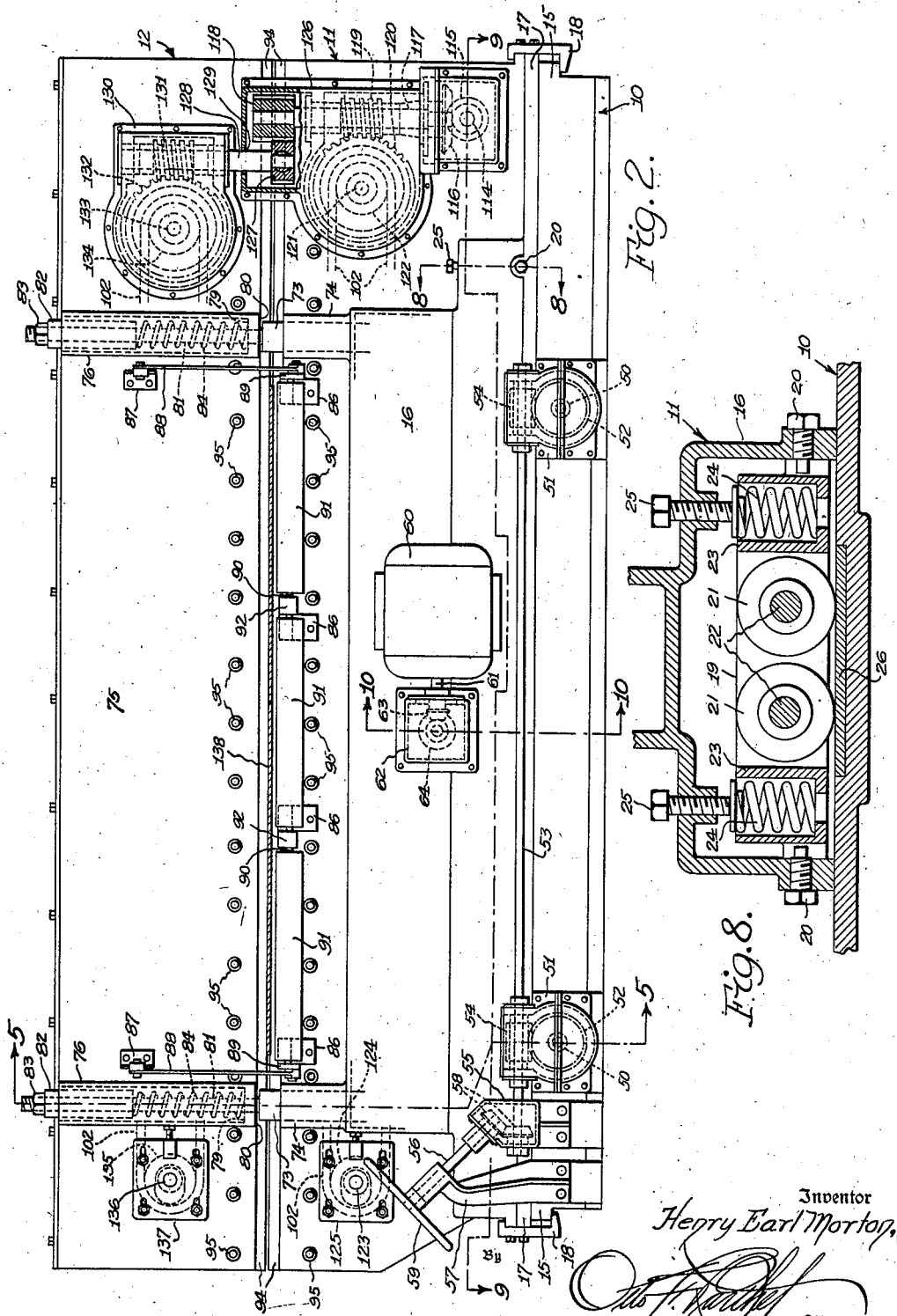

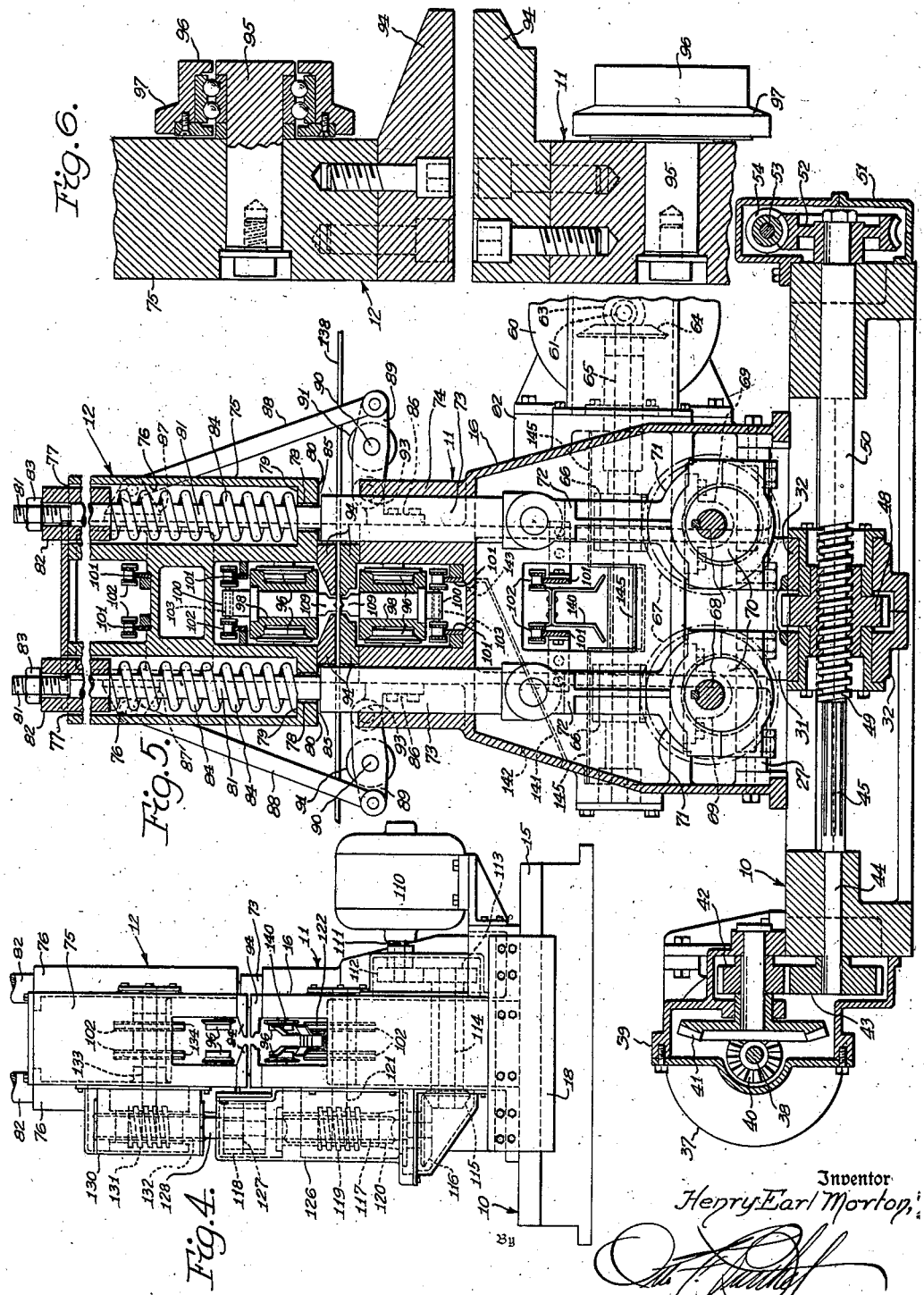

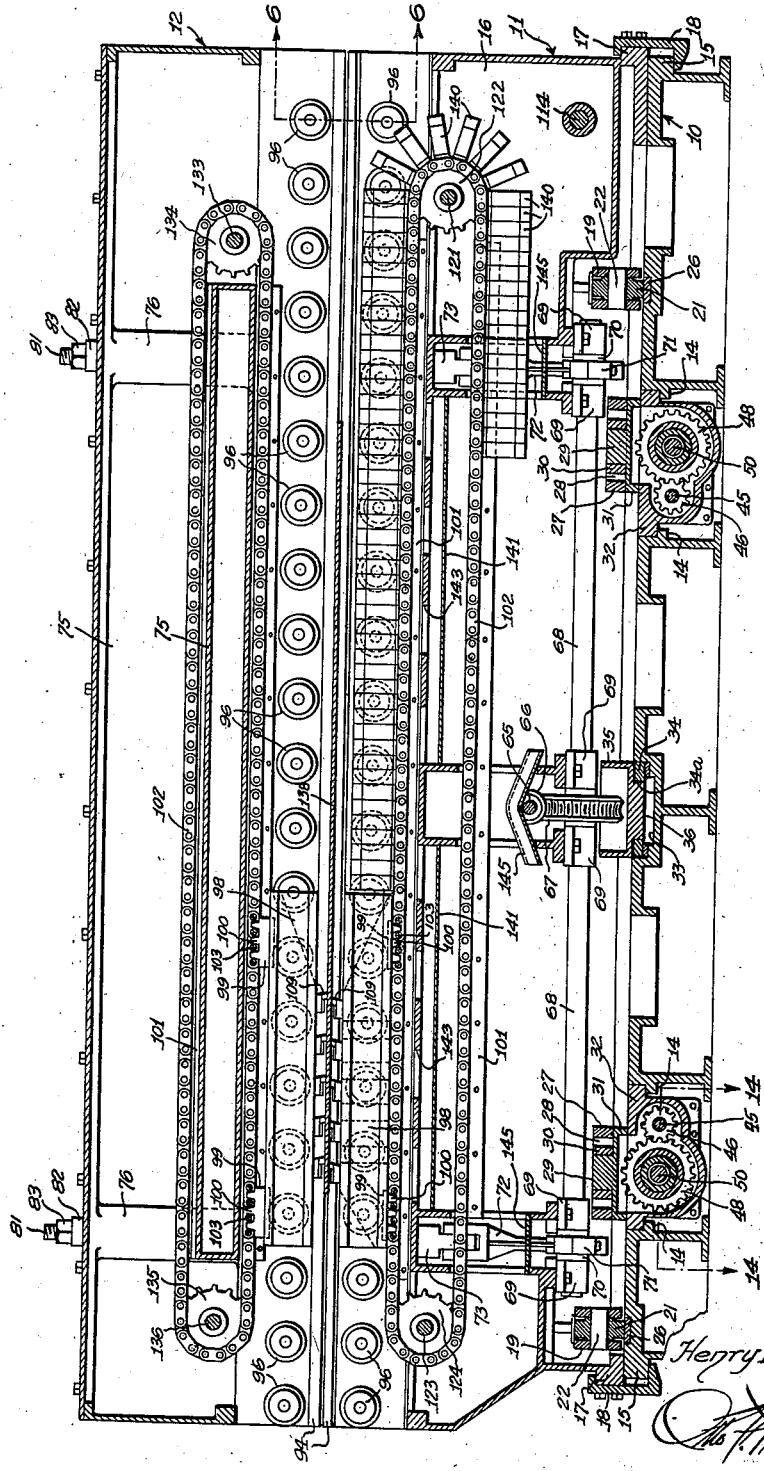

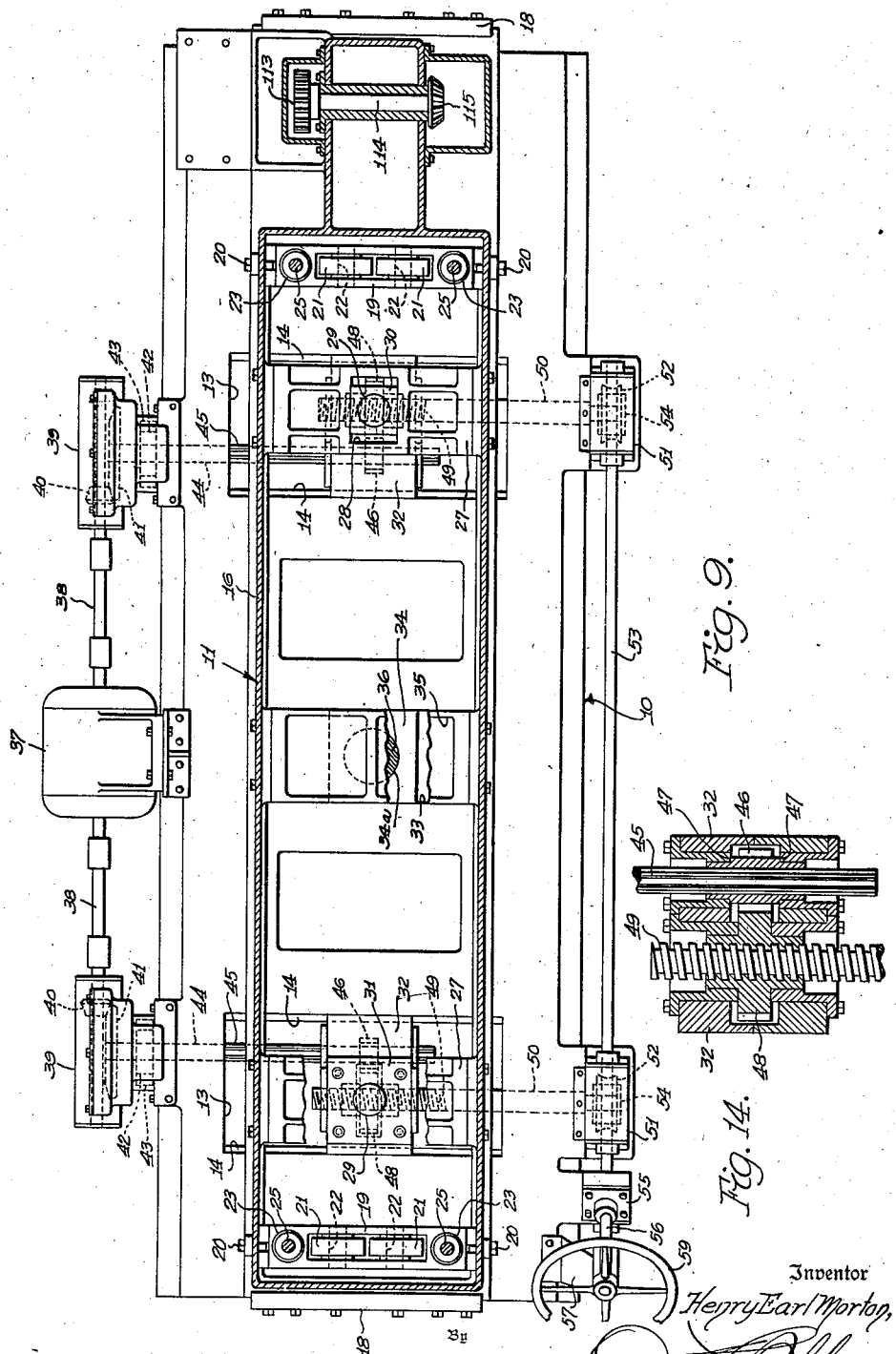

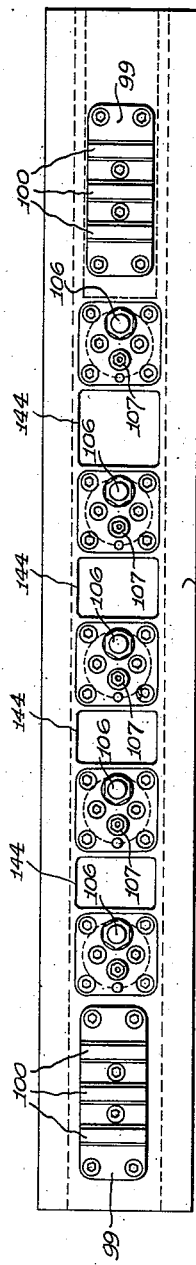

Patented May 19, 1942

2,283,507

UNITED STATES PATENT OFFICE 2,283,507

FLASH REMOVING MACHINE

Henry Earl Morton, Muskegon Heights, Mich.

Application September 21, 1939, Serial No. 295,875

11 Claims. (Cl. 90—38)

This invention relates, in general, to cutting machinery and, in particular, to a new and improved machine for heavy duty flash trimming.

One of the objects of the present invention is to provide a new and improved flash trimming machine wherein the objections found with machines of a similar type at present in use have been obviated.

Another object herein is to improve the mechanism and the arrangement of the parts of a heavy duty flash trimming apparatus so as to increase, enhance, simplify and improve the efficiency, utility and operativeness, construction and compactness thereof.

Another object is to provide a new and improved flash removing apparatus in which is employed a pair of work-supporting, tool-carrying units, the elements of which are so relatively movable and arranged as to improve not only the flexibility of the apparatus as a whole with respect to the work but also the character and standard of the results obtained thereby.

Another object is to provide a new and improved work-supporting structure for a heavy duty flash trimming machine.

Another object is to provide a new and improved tool-supporting structure for a heavy duty flash trimming apparatus.

Another object is to provide a new and improved supporting structure for the work-supporting structure of a heavy duty flash trimming machine.

Another object is to provide a new and improved tool-supporting structure and drive therefor to be employed in a heavy duty flash trimming machine.

Another object is to improve a heavy duty flash trimming apparatus wherein the introduction into and passage through said apparatus of the work is made easier and the clamping of the work during the flash removal operation made more secure than heretofore.

Another object is to improve a heavy duty flash trimming apparatus wherein the work support is more readily and effectively adjustable to irregularly dimensioned and/or inaccurately inserted work than heretofore.

Another object is to provide a heavy duty flash trimming machine with a new and improved connection between the superstructure and base of said machine whereby the two are movable relatively to each other with minimum friction therebetween and the weight of one upon the other is materially absorbed and substantially counter-balanced.

Another object is to improve a flash trimming machine so that the driving mechanism thereof is effectively protected from the trimmed flash.

Other objects and advantages of the invention will become readily apparent from a reference to the following specification taken in conjunction with the accompanying drawings of which there are seven (7) sheets and wherein:

Figure 1 is a plan view of the apparatus in which is embodied the invention;

Figs. 2, 3 and 4 are elevational views looking at the right, left and rear ends, respectively, of the apparatus shown in Fig. 1;

Figs. 5, 8, 9 and 10 are sections taken along the lines 5—5, 8—8, 9—9 and 10—10, respectively, in Fig. 2;

Figs. 6 and 14 are sections taken along the lines 6—6 and 14—14, respectively, in Fig. 7;

Fig. 7 is a section taken along the lines 7—7 in Fig. 1;

Figs. 11 and 12 are plan and vertical views, respectively, of the cutter head embodied in the apparatus, Fig. 12 being partly broken away and in section to show more clearly the details of construction thereof;

Fig. 13 is a section taken along the lines 13—13 in Fig. 12;

Fig. 15 is a skeleton, plan view of the apparatus as viewed at right angles to the showing in Fig. 1 with the work sheet in place therein;

Fig. 16 is a perspective view of a work sheet prior to the planing of the flash thereon; and Fig. 17 is an elevational view looking at the front of the apparatus and showing the head separated from the work sheet supported therein.

The apparatus which is disclosed in the figures comprises, in part, a base and a multi-section super-structure, the former being generally indicated at 10 and the lower section of the latter being generally indicated at 11 while the upper section is generally indicated at 12.

Base 10 is rigid and stationary, same being rectangular in plan and having an upper wall which supports the super-structure 11—12, said wall being vertically spaced from the floor upon which the apparatus is supported and provided with a pair of spaced, rectangular openings 13 (see Figs. 1 and 9) for accommodating portions of the structure section 11. Slightly below the upper level of the base 10, within each of the openings 13 therein, said base is integrally formed with a pair of oppositely disposed guide shoulders 14 (see Fig. 7), and at each of the two shorter ends of said base there is integrally formed a guide flange 15 (see Figs. 2, 3 and 7). Though the purposes of the two openings 13, the two sets of shoulders 14 and the two flanges 15 will be presently described, it is sufficient at this time to say that said flanges, said shoulders and the longitudinal axes of said openings are parallel and extend in a direction which is normal to the longitudinal axis of the apparatus.

Section 11 of the super-structure 11—12 includes a generally hollow, rectangular casing 16 which rests upon and is supported by the base 10 and which itself supports the other structure section 12, the longitudinal axis of said section 11 being parallel with the longitudinal axes of said base and the apparatus in general. The lower end of casing 16 is substantially as long as the base 10, though not as wide, and at each of the shorter ends of said casing there is integrally formed a flange 17 which seats upon the respective flange 15 on said base so that, with the aid of a pair of elongated channels 18 each of which is fixedly secured to one of said flanges 17 and slidably unites said flange 17 to its respective flange 15, the section 11 is relatively movable with respect to the base 10, and guided in such movement, along a path which is transverse to the longitudinal axis of the apparatus. It will be noted particularly in Fig. 7 that there is a slight lateral spacing between the outer wall of each flange 15 and the opposite wall of the respective channel 18, and the purpose of these spacings will be subsequently described.

In view of the facts that the super-structure 11—12 is necessarily massive and, therefore, heavy and that it is desirable that it be movable relatively to the base 10 along the guided path defined by the flanges 15 and 17 and channels 18, means should preferably be provided for facilitating this relative movement. So, as shown in Figs. 7, 8 and 9 (Fig. 8 being a detail), near each end of the casing 16 and encased thereby there is provided a rectangular frame 19 which extends between the long sides of said casing and is floatingly carried at its ends by means of oppositely disposed screws 20 threadedly secured in said casing sides and extending into vertically elongated openings in said frame. The floating connection between each frame 19 and its two screws 20 provides means whereby said frame may be guided and moved vertically with respect to the casing 16 and yet prevented from moving longitudinally with respect to said casing, and said connection may be adjusted so that said frame may move transversely with respect to said casing. Each frame 19 is centrally hollow in order to support therewithin a pair of rollers 21 carried upon parallel shafts 22 mounted at their ends into the adjacent sides of said frame, each pair of said shafts being parallel to the longitudinal axis of the apparatus in general and being at a level whereat the rollers 21 carried thereon extend slightly below the lower level of said frame so that the frame itself is supported at all times above said latter level. At or near each end of each of the frames 19 there is integrally formed a boss 23 having a vertical bore in which is mounted a coil spring 24, the frame itself providing a stop for the lower end of each of said springs and a shoulder-ended set screw 25, threadedly mounted in the casing 16, providing a stop for the upper end of each of said springs. If desired, the base 10, directly below each pair of rollers 21, may be provided with a stationary, rectangular plate 26 of relatively hard material so as to resist, over a greater period of time than otherwise, the pressure and rolling action of said rollers. Since the rollers 21 extend slightly below the lower level of the frames 19, and since the weight of the superstructure 11—12 tends to be transmitted through the screws 25 to force said frames downwardly, said rollers tend to relieve the friction between the base 10 and structure section 11 during the transverse movement of the latter relatively to the former, and said springs tend to counter-act the weight of said section 11 upon said base 10.

Looking in particular at Figs. 7 and 9, the casing 16 of the structure section 11, on its underside adjacent each of the two openings 13 formed in the base 10, has integrally secured thereto between its long side walls a cross member 27, each of said cross members being formed in its upper surface with a central, rectangular opening 28 the longitudinal axes of which openings 28 are substantially coincident and parallel with the longitudinal axis of the apparatus in general. Extending into each of the openings 28 is a pin 29, and mounted on each of said pins is a block 30 which is substantially as wide as the width of the opening receiving it and slightly less in length than the length of said opening so that each pin and its respective block are free to move as a unit relatively to the opening receiving it in the direction of the length of the latter and yet unable to move in the direction of the width of the opening. Integrally mounted to the underside of each pin 29, and directly under the respective cross member 27 and block 30, is a gear housing cover plate 31 to the underside of which is securely fixed a gear housing 32, each of said gear housings extending into the opening 13 provided therefor in the base 10 and slidably cooperable with the pair of guide shoulders 14 formed therein. It will be noted that the gear housings 32, because of the tracks formed by the shoulders 14 and their cooperation therewith, move with the casing 16 in only that direction which is normal to the longitudinal axis of the apparatus in general. It will further be noted that the casing 16, because of the loose connection between it and each of the blocks 30, may move not only with the housings 32 in the above mentioned purely transverse direction but also relatively to said housings about a vertical axis centrally therebetween. The mechanism for which the gear housings 32 are provided will be subsequently described.

Substantially centrally between the openings 13 which are formed in the base 10 and receive the gear housings 32 carried by the casing 16 there is formed in said base a rectangular depression 33 running in parallelism with said openings (see Figs. 7, 9 and 10), said depression being shouldered along its opposite, longer edges and slidably receiving thereon a support or plate 34 having a central opening 34a. The width of the plate 34 is substantially the same as the distance between the opposite walls of the depression 33, which distance is the width of said depression, and the length of said plate is less than the length of said depression, so that said plate is free to move in the direction of the longitudinal axis of said depression but not in a direction normal to said axis. A cup-shaped member 35 is rigidly secured to the casing 16 for movement therewith and is integrally formed on its undersurface with a cylindrical boss 36 which is in fitting engagement with the opening 34a in the annular plate 34, the axis of said opening being that vertical axis which was referred to at or near the end of the last paragraph.

The purpose of providing a relative movement between the super-structure and the base which supports it in a direction normal to the longitudinal axis of the apparatus and about the vertical axis of the opening 34a is to enable the movable super-structure to be moved relatively to the massive work sheet which has, perhaps, been introduced into the apparatus and assumed a position whereat the cutters and the flash to be removed thereby are not properly located with respect to each other. It has been found easier to insert the work sheet into the apparatus and then hold it stationary while the apparatus is moved relatively thereto than to do the reverse because of the enormous size and weight of the work piece and the difficulty in handling same.

The apparatus which enables the movement of the super-structure 11—12 in a direction which is purely normal to the longitudinal axis of the machine in general and relatively to the base 10, that is, along the front and rear guide flanges 15, the plates 26, the guide shoulders 14 and the centrally located, shouldered depression 33, includes a motor 37 of the type which is reversible and easily controllable and which is provided with a pair of oppositely disposed drive shafts 38. Each of the shafts 38, at its driving end, is appropriately supported within a casing 39 mounted on the base 10 and has fixed thereon for rotation therewith a pinion 40. Journalled in a wall of each of the casings 39 for rotation about an axis normal to the co-axes of the shafts 38 is the hub of a gear 41 which gear is arranged in mesh with the pinion 40 thereadjacent and to be driven thereby and on which hub is arranged for rotation therewith another gear 42. In mesh with each of the gears 42, to be driven thereby, is a speed reducing gear 43 which is carried within its respective casing 39 and fixedly upon the end of a shaft 44, each of said shafts being journalled for rotation about its axis in the base 10 and extending therefrom inwardly of the apparatus. The two shafts 44 are parallel with each other and normal to a vertical plane which is coincident with the longitudinal axis of the apparatus and each is formed, inwardly of its supported portion, with an integral, axially directed, splined section 45. A detail of the structure outlined in this paragraph is clearly shown particularly in Fig. 5.

Continuing with the description begun in the last paragraph, and referring particularly to Fig. 14, each of the axially splined, driving shafts 44—45 extends into the previously described gear housing 32 provided therefor, and on this extended end of each of said shafts within the housing therefor there is mounted for rotation therewith and, yet, axial movement relatively thereto a pinion 46. It will be noted that each of the pinions 46 is formed with a pair of axially spaced, annular shoulders 47 each of which shoulders cooperates with an adjacent portion of the housing 32, or a section integral therewith, so as to oppose relative axial movement between said pinion and said housing and to enable the rotation of said pinion with its driving shaft 44—45 and axial movement of said pinion and said housing as a unit relatively to said shaft. Also carried in each of the housings 32 is a speed reducing gear 48 which is in mesh with the pinion 46 thereinto be driven thereby, it being noted that each of the gears 48, like its respective pinion 46, is arranged for non-relative movement axially, with respect to the housing encasing it. Each of the gears 48 is centrally formed with a screw-threaded bore which receives an end, screw-threaded section 49 of a shaft 50, the opposite end of each of said shafts being journalled in the wall of the base 10 opposite the wall carrying its driving shaft 44—45. It is readily seen, then, that rotation of the shafts 44—45 by the motor 37 causes rotation of the gears 48 upon and along the shafts 49—50 and a resulting movement of the super-structure 11—12 relatively to the base 10 and to the shafts 49—50 and 44—45 in a direction purely normal to the longitudinal axis of the apparatus in general, the shafts 49—50, incidentally, being parallel with the shafts 44—45, and the rate of axial movement of the pinions 46 along the shafts 44—45 being equal to the rate of axial movement of the gears 48 along the shafts 49—50.

The mechanism for turning the super-structure 11—12 about its central, vertical axis (which is coincident with the axis of the plate opening 34a, as shown in Fig. 10) relatively to the base 10 is arranged on and supported by that side of said base which is opposite the side supporting the motor 37 and the casings 39. This mechanism includes a pair of casings 51 which are mounted on the base 10 in alignment with the journalled ends of the screw-threaded shafts 49—50, and in each of said casings there is confined a worm gear 52 which is fixed for rotation on and with the one of said shafts extending thereinto. The casings 51 provide a bearing support for a rotatable shaft 53 which extends between and through said casings in parallelism with the longitudinal axis of the apparatus in general, and on said shaft in driving engagement with each of the worm gears 52 there is integrally formed a worm 54. One end of the shaft 53, preferably the front end, extends outwardly from that casing 51 thereadjacent into journalled relationship with another casing 55 which is mounted on the base 10, and this casing 55 also supports one end of another shaft 56, the other end of said shaft 56 being supported for rotation by a bracket 57 which is rigidly mounted on said base. Those ends of the shafts 53 and 56 which are confined within the casing 55 rotatably carry a set of meshed bevel gears 58, and on the outer end of said shaft 56 there is rotatably carried a hand wheel 59 by which said shaft 56 may be turned to turn said shaft 53. Therefore, when the hand wheel 59 is turned in either of its two directions, whether or not the motor 37 is operating, the two worms 54 will be simultaneously turned uni-directionally and this will cause a uni-directional turning of the two screw-threaded shafts 49—50 through the agency of the driving engagement between said worms and the two worm gears 52 which are rotatably carried on said shafts. But, as will be noted in Fig. 9, the two screw-threaded sections 49 of the shafts 49—50 are reversed in direction, so that the uni-directional turning of said shafts will cause the super-structure 11—12 to turn about its aforementioned centrally vertical axis through the opposed agencies of the driving engagement between the one section 49 and its cooperating gear 48 and between the other section 49 and its cooperating gear 48. As is readily apparent, the turning of the super-structure relatively to the base supporting it and about its central, vertical axis is permissive because of the previously described end clearances between the cross members 27 and the blocks 30 therewithin (see Figs. 7 and 9), by the previously described pivotal connection between the annular plate 34 and the cylindrical boss 36 (see Figs. 7 and 10), by the previously described clearances between the channels 18 and the guide flanges 15 (see Figs. 2, 3 and 7), and by the freedom of connection between the super-structure and the base at any other point than already mentioned and described.

It is clear that the shafts 49—50 are driven exclusively by the turning of the hand wheel 59, since the turning of the gears 48 by the pinions 46 on the shafts 44—45 is not effective in turning said shafts 49—50 because of the worm and worm gear connections 54—52. It is also clear that the axes of the shafts 44—45 and 49—50 are fixed and permanently parallel, the super-structure 11—12 being moved along the path normal to the longitudinal axis of the machine and also about its central, vertical axis by said shafts but being structurally independent thereof.

Without discussing at present the details of construction of the two sections 11 and 12 of the super-structure, it is simply to be noted that the section 12 is supported by and vertically movable toward and from the section 11, the work sheet being carried between and clamped by said sections during the removal of one flash therefrom and movable as a body relatively thereto during the change to the next flash to be removed, said sections 11 and 12 being movable as a unit in the manners previously described and relating to the functions of the motor 37 and the hand wheel 59. This mechanism which vertically moves the section 12 toward and from the section 11 includes a motor 60 which is similar to motor 37 and fixedly mounted on the casing 16 of said section 11 on the side of the machine opposite said motor 37. Motor 60 has a shaft 61 which is rotatably supported by the wall of a casing 62, said casing being fixedly mounted on the casing 16 adjacent said motor, and fixed on said shaft within said casing 62 is a pinion 63. Pinion 63 is arranged in driving mesh with a gear 64, said gear being mounted for rotation on and with a shaft 65 which extends transversely between the long walls of the casing 16 and is supported for rotation about its axis thereby. Intermediate the ends of the shaft 65 there is formed integrally thereon a pair of spaced worms 66, said worms being shown in Fig. 10 as having opposite drives, but this is purely optional because the effect will be the same regardless of the driving direction of either or both thereof. In driven mesh with the worms 66 is a pair of worm gears 67 which are mounted for rotation on and with a pair of parallel, horizontal shafts 68 arranged on opposite sides of a vertical plane which is coincident with the longitudinal axis of the apparatus in general, the ends of each of said shafts, as shown in Fig. 7, extending longitudinally from opposite sides of the gear 67 carried thereby and said shafts being mounted in bearings 69 carried by the under section of the casing 16 slightly above the base 10.

It will be noted in Fig. 7 that each of the two parallel shafts 68 is supported centrally and at its ends by the bearings 69, the central bearings being arranged on opposite sides of the worm gear 67 carried on said shaft and driven by its respective worm 66, and the pair of bearings 69 at each end of said shaft being arranged on opposite sides of an eccentric 70 rotatably carried by said shaft. Mounted about each of the four eccentrics 70 is a strap 71 which is a part of a bifurcated crank arm 72 between the upper bifurcations of each of which arms is pivotally connected the lower end of a reciprocable supporting member 73 for operatively connecting the upper section 12 to the lower section 11. Members 73 are shown in the form of rods which extend in parallelism vertically upwardly from their pivoted connections with the arms 72 through guide bosses 74 provided therefor on the upper portion of the casing 16 of the lower section 11. Since, as it will be noted in Fig. 5, the eccentrics 70 (of which there are four) are arranged in the two shafts 68 at the same angle of eccentricity, rotation of said shafts in the same direction by the motor 60 through the agency of the mechanism already described will cause the four supporting members 73 to move, relatively to their guide bosses 74, upwardly and downwardly together, said motor 60 being controlled in any suitable manner so that said members 73 can be moved together in either direction all or any part of a half-cycle, the distance of a half-cycle movement, of course, being the distance between the two extreme positions of the axis of any one of said eccentrics 70.

The upper section 12 of the super-structure 11—12 includes an elongated casing 75 on each of the two long sides of which is integrally formed a pair of longitudinally spaced, hollow bosses 76 which are coaxially aligned with the guide bosses 74 therebelow. Each of the bosses 76, as shown in Fig. 5, is open at both ends, the upper opening 77 being substantially the same diameter as the inner diameter of said boss, and the lower opening 78 being substantially lesser in diameter than said inner diameter whereby the lower wall of said boss is directed annularly inwardly toward the axis of said boss to provide inner and outer shoulders 79 and 80 thereat. Through the lower openings 78 in the bosses 76 extend reduced portions 81 of the supporting members 73, said reduced portions extending upwardly through said bosses and outwardly through the upper openings 77 therein. On the outer end of each of the reduced portions 81 is freely mounted a sleeve 82 which is reciprocable within and relatively to the boss 76 receiving said portion, said outer end of said portion being threaded to receive a nut 83 for limiting or providing a stop for the upward movement of said sleeve, and between each sleeve and the respective inner shoulder 79 formed by the lower wall of each of said bosses there is telescopically arranged about said reduced portion a coil spring 84.

As will be noted particularly in Fig. 5, which is a view showing the upper section 12 in its lowermost position with respect to the lower section 11, there is a clearance 85 provided between each lower or outer shoulder 80 and the shoulder formed on the respective member 73 by its reduced portion 81. These clearances 85 enable the springs 84, the force of each of which is adjustable by its respective nut 83, to constrain the casing 75 downwardly relatively to the reduced portions 81 of the members 73 when the eccentrics 70 have positioned said members 73 in their lowermost positions which are, as has been said, shown in Fig. 5. Of course, when the members 73 are spaced from the positions thereof shown in Fig. 5, such as when the clearances 85 have been taken up and the members 73 are moving upwardly or downwardly, the aforementioned shoulders on said members 73 are in contact with the shoulders 80, the casing 75 and members 73 move together, and the springs 84 are thereawhile ineffective because of their disposition between the unitarily moving shoulders 79 and sleeves 82. The purpose of enabling the upper section 12 of the super-structure 11—12 to be forced downwardly, toward the section 11 (by the springs 84 in addition to the weight of said section), after the supporting members 73 have assumed their lowermost positions, is to assure an effective clamping action upon the work sheet (which is held between the sections 11 and 12) without relying totally upon the precision of the eccentrics 70, which precision might be lacking.

A further provision for assuring an effective clamping action upon the work sheet by the sections 11 and 12, in the event that the thickness of said work sheet is not uniform laterally of the flash sought to be removed, resides in the provision of the annular spacings between the reduced portions 81 of the members 73 and the walls of the lower openings 78 in the bosses 76 and between the sleeves 82 and the walls of the upper openings 77 in said bosses. These spacings enable the upper section 12 to tilt, slightly, with respect to the lower section 11, whereby the clamping force exerted upon the work sheet supported between said sections is distributed uniformly thereover.

Still referring particularly to Fig. 5 and in general to Figs. 1, 2, 3 and 17, it will be noted that each long side of the casing 16 of the lower section 11, intermediate the guide bosses 74, has fixed thereon a plurality of spaced brackets 86, and that each long side of the casing 75 of the upper section 12, intermediate the bosses 76, has fixed thereon a plurality of spaced brackets 87. To each of the brackets 87 is pivotally connected one end of an arm 88, and to each of the end brackets 86 is pivotally connected one end of an arm 89. The arms 89 and the arms 88 on each side of the machine are pivotally connected together at their free ends, and on each side of the machine there is arranged a floating, horizontal axle 90 which extends between and is journaled for rotation at its ends in said arms 89, each of said axles freely carrying a plurality of spaced rollers 91 which are movable with their respective axle and rotatable about the axis thereof. In between each pair of rollers 91 there is freely carried on each axle 90 one end of a hanger 92, the other end of each of said hangers being freely carried on a stationary axle 93 which is supported by the brackets 86 on that side of the machine threadjacent.

It will be noted in Fig. 5 that the rollers 91 are laterally offset from the stationary axles 93, which means that the vertical movement of said rollers is not as extensive as the vertical movement of the upper section 12 toward and from the lower section 11. It will also be noted that, when the upper section 12 is in its lowermost position with respect to the lower section 11, the tops of the rollers 91 are below the upper level of said lower section, which means that, while the work sheet is being planed, said rollers are out of interference therewith, and that, when said upper section is in a raised position from said lower section, the tops of said rollers are intermediate the lower level of said upper section and the upper level of said lower section so that the work sheet may be inserted into or moved through the machine upon the substantially frictionless rollers. It will further be noted that the distance between the tops of the rollers 91 and the upper level of the lower section, when the machine is in the position shown in Fig. 5, is greater than the vertical height of the clearances 85, which means that the tops of said rollers will remain below said upper level until the members 73 have substantially moved the upper section 12 away from the work sheet so that the upward movement of the sheet from the section 11 by the rollers 91 will not be opposed by the section 12.

The work clamping portions of the lower and upper sections 11 and 12 of the super-structure comprise elongated jaw members 94 which are planar and of substantially large area at their clamping surfaces for effectively clamping the work sheet over a large portion of its surface area on the two sides of said sheet and laterally adjacent the flash to be removed. These members 94 are rigidly secured to or integrated with the upper and lower portions, respectively, of the sections 11 and 12 and extend substantially the entire lengths of the casings 16 and 75 in parallelism with the longitudinal axis of the apparatus, there being two of said members for each of said sections and the inner and opposing longitudinal edges of each pair of said members being arranged in immediate proximity to each other whereby the clamping of the work sheet may be as close to the flash as possible while still allowing space therebetween for the cutters (which are to be described). It will be noted in Fig. 5 that the jaw members 94 allow free movement of the reciprocable supporting members 73 and that the clearances 85 exist or may exist when said members 94 are in clamping engagement with the work sheet.

The casings 16 and 75 are longitudinally hollow adjacent the jaw members 94 carried thereby, and to the casing 75 above each of its members 94 and to the casing 16 below each of its members 94 is mounted, by means of parallel pins 95, a row of freely rotatable rollers 96, there being two of said rows for each of said casings, and the axes of the rollers carried by said casing 75 all being in a single plane while the axes of the rollers carried by said casing 16 all being in another plane parallel therewith. Each of the rollers 96 is formed with an annular shoulder 97, and the shoulders on the one row of rollers of each of the sections 11 and 12 cooperate with the shoulders on the other row of rollers of each of said sections to form upper and lower longitudinal guideways for the cutters.

Mounted upon and between the rollers 96 of each section 11 and 12, for sliding movement relatively thereto, is an elongated cutter head 98 each of which is appropriately recessed at and along its opposite sides for cooperably receiving the rollers threadjacent to be guided thereby in its longitudinal reciprocable movement. (Details of these cutter heads 98 are shown in Figs. 11, 12 and 13.) Each of the cutter heads 98 is substantially shorter in length than the length of the section 11 or 12 supporting it, as will be seen in Fig. 7, and at or near each of the two opposite ends of each of said heads, on the top of the upper head and on the bottom of the lower head, is fixedly secured for movement therewith a rack segment 99 the teeth 100 of which are vertically spaced from the adjacent level of the respective head and through the agency of which teeth said head is reciprocably driven along its supporting rollers 96 relatively to its respective section 11 or 12.

To each of the casings 16 and 75 of the sections 11 and 12, above the upper cutter head 98 and below the lower cutter head 98, are fixedly secured two horizontal pairs of vertically spaced, longitudinally extending, parallel guide rails 101 the guiding surfaces of which pairs lie in four parallel planes, the two intermediate planes lying adjacently without the two cutter heads and within the other two planes, and the two rails of each of the four pairs lying on opposite sides of and equidistant from a vertical plane coincident with the longitudinal axis of the apparatus in general. Each set of these rails 101 which comprises the two carried by either casing 16 or 75 on either side of the vertical plane coincident with the longitudinal axis of the apparatus is operable for guidingly supporting an endless chain 102, and, as will be noted in Fig. 5, the two laterally spaced upper chains which are carried on and guided by the two upper sets of guide rails are joined together for unitary movement by means of a plurality of transverse pins 103, and the two lower chains are similarly joined together for unitary movement, said pins being in driving engagement with the teeth 100 on the segments 99 of the cutter heads 98 whereby the latter are driven along their rollers 96.

Before describing the mechanism for driving the chains 102, it will be noted that each of the two cutter heads 98 has formed vertically therethrough a series of longitudinally spaced bores 104 in each of which bores is adjustably mounted a cutter assembly, the assemblies being adjustable at the top of the upper head and at the bottom of the lower head so that it is preferable to provide these bores intermediate the two end segments 99 on each head. The cutter assembly which is mounted in each bore 104 comprises a body member 105 which is fixed in said bore against rotary and vertical movements relatively thereto, and each member 105 carries a pair of vertically adjustable pins 106 and 107, the end of the pin 106 opposite its adjustable end carrying a wedge 108, and the end of the pin 107 opposite its adjustable end being in driving engagement with the inner end of a cutter 109. The cutters 109, except for their adjustments, are movable unitarily with their reciprocable heads 98, the cutting edges of said cutters being directed normal to the direction of movement thereof and extending laterally on both sides of the longitudinal axis of the apparatus so as to laterally overlap the flash to be removed from the work sheet thereby, the cutters on the one head being directed toward the cutters on the other head so that the flash on both sides of the work sheet may be removed simultaneously, the cutters residing between and with slight spacing from the opposing inner edges of the jaw members 94, and the pins 106 and 107 and wedge 108 in each case serving to eliminate inadvertent or unintentional displacement of their respective cutter 109 from its adjusted position or level with respect to the corresponding cutter on the other head.

The mechanism for driving the chains 102 which in turn drive the cutter heads 98 comprises a motor 110 which is similar to either of the motors 37 or 60 and controlled in a manner preferably to cause said chains to be driven first in one direction and then in the other so as to reciprocate said heads with respect to the flash to be removed by their cutters 109. The motor 110 is mounted on the lower section 11 of the super-structure and has a drive shaft 111 upon the end of which is fixedly mounted for rotation therewith a pinion 112. Pinion 112 is in driving mesh with a gear 113 which is fixedly mounted on the adjacent end of a horizontal, transversely extending shaft 114 upon the opposite end of which shaft is fixedly mounted a bevel pinion 115, shaft 114 being supported for rotation about its horizontal axis in and by the opposite side walls of the casing 16 or parts integral therewith. Arranged in driven mesh with the bevel pinion 115 is a bevel gear 116 which is secured to the lower end of a vertical shaft 117 supported by the casing 16 or parts integral therewith for rotation about the vertical axis thereof. The end of the shaft 117 opposite the gear 116 has mounted thereon for rotation therewith a pinion 118, and intermediate the gear 116 and pinion 118 said shaft has formed integrally thereon a worm 119. The worm 119 is in driving mesh with a worm gear 120, and said worm gear is drivingly mounted on a transverse shaft 121 which carries a pair of spaced sprockets 122 which rotate with said shaft and are in driving engagement with the two lower chains 102 which drive the lower cutter head 98 along its rollers 96 through the agency of the lower sets of teeth 100, there being positioned another transverse shaft 123 forwardly of and in parallelism with said shaft 121 on which shaft 123 is mounted for rotation therewith another pair of spaced sprockets 124 which also mesh with said lower chains. The shaft 121 is carried by the opposite walls of the casing 16 or parts integral therewith for rotation about its axis, and the two lower chains 102, as have been described, are simultaneously driven in one direction or the other or otherwise as preferred by the motor 110 and proper control thereof, while the shaft 123 is carried in bearing plates 125 mounted on the opposite walls of said casing 16 for adjustable positioning toward and from the shaft 121 whereby the tension of the lower chains 102 is controlled.

It will be noted in Fig. 2 that a housing 126 which is rigidly mounted to the casing 16 and movable with the latter, encases the pinion 115, gear 116, shaft 117—119, pinion 118 and worm gear 120, said housing also encasing another gear 127 which is in driven mesh with said pinion 118 and mounted on and for rotation with a vertical shaft 128. Though a gear 127 is driven by and in accordance with the pinion 118, the connection between said gear and the end of its shaft 128 is shown as being substantially universal so as to permit the axes of said gear and said pinion to remain vertical and parallel while the axis of said shaft is disposed out of parallelism therewith, such as when the work sheet is not uniform in thickness adjacent the flash thereon and the upper section 12 is, as a result, automatically tilted with respect to the lower section 11, the possibility of and accommodations for such tilting having been previously described. The shaft 128 upon which the gear 127 is mounted extends upwardly through an enlarged opening 129 provided therefor in the housing 126 and into supported relationship with another housing 130 which is fixedly mounted on the casing 75 for movement therewith, said opening allowing for the tilting movement of said shaft relatively to said housing 126. Since the upper section 12 is vertically movable toward and from the lower section 11 for permitting introduction and removal of work to and from the machine, the pinion 118 is axially longer than the gear 127 so that said gear will remain in mesh with said pinion notwithstanding the vertical movement relatively therebetween.

Within the housing 130 the vertical shaft 128 has integrally formed thereon a worm 131, said worm being similar to the worm 119 on the shaft 117 and being in driving mesh with a worm gear 132 which is mounted on and for rotation with a transverse shaft 133 which is carried by the casing 75 or integral parts thereof. The shaft 133 is normally parallel with the transverse shaft 121 which drives the two lower chains 102 and itself carries a pair of spaced sprockets 134 in mesh with and for driving the two upper chains 102, said upper chains being also in mesh, at the opposite end of the machine, with another pair of sprockets 135 fixedly carried for rotation on another transverse shaft 136 which is parallel with the shaft 133 and adjustably carried in bearing plates 137 similar to the plates 125 but carried by the casing 75.

The two lower chains 102, being joined together by the pins 103, move as a unit and drive, through the agency of the lower sets of teeth 100, the lower cutter head 98 along its guiding rollers 96, said teeth being in driven engagement with the upper runs of said lower chains. The two upper chains 102, being also joined together by other pins 103 and driven by the mechanism previously described, move as a unit simultaneously with the lower chains 102 and drive, through the agency of the upper sets of teeth 100, the upper cutter head 98 along its guiding rollers 96, said teeth being in driven engagement with the lower runs of said upper chains. The chain-driving mechanism is shown as driving the upper runs of the lower chains 102 and the lower runs of the upper chains 102 (and, therefore, the lower and upper cutter heads 98) simultaneously in the same direction, but this showing is purely illustrative since it is clear how and contemplated that said upper runs and said lower runs may and will be driven simultaneously in opposite directions. The speed and direction-changing of the upper and lower sets of chains 102 are controlled at the motor 110.

In practice, the work sheet 138, before being introduced into the machine herein described, has its various sections welded together, as at 139, so as to produce a single sheet of extensive length. The flash 139 usually exists on both sides of the extended sheet 138 and runs transversely thereof at spaced intervals, and it is this flash which is to be removed. The sheet 138 is inserted in the direction of its length into the machine upon the raised rollers 91 between the separated sections 11 and 12, that is, between the lower and upper jaw members 94 and between the longitudinally spaced pairs of vertically movable supporting members 73. In the event the flash 139 does not become positioned properly with respect to the cutters 109, the motor 37 and/or the hand wheel 59 are operated to move the sections 11 and 12 as a unit relatively to the stationarily held sheet 138 and to the base 10 until said cutters lie directly above and below said flash. The motor 60 is then operated to lower the upper section 12 and rollers 91 with respect to the lower section 11 and sheet 138 whereupon the jaw members clamp said sheet in place for the planing or cutting operation. In the event the sheet 138 is not of uniform thickness where it is gripped by the members 94, the upper section 12 is free to tilt and adjust itself with respect to this unevenness. The motor 110 is then operated to drive the cutter heads 98 relatively to the sections 11 and 12 and the sheet 138 whereby the flash 139 is removed. Thereafter, the sections 11 and 12 are separated, the sheet 138 is moved in the direction of its length until the next flash portion 139 is properly positioned between the cutters 109, the sections are returned to clamping position, and the trimming or cutting operation is repeated.

As a precaution against injury to the mechanism disposed below the cutter heads 98 which would be due to particles of the removed flash 139 falling thereon, the upper runs of the two lower chains 102 carry therebetween, a head of the lower cutter head 98, a series of U-shaped members 140 which are arranged one against the other to form a continuous channel and which are individually connected to said upper runs to enable their separation during the movement of said lower chains upon the sprockets 122. Chips or shavings from the removed flash 139 fall into the movable channel formed by the members 140 and are carried therein to the rear of the machine whereat the lower chains 102 make their turn about the sprockets 122. There may be provided a receiver (not shown) below the point at which the chains turn for receiving the chips which are discharged from the separable members 140. Since the members 140 are capable of receiving only those chips which are removed from the sheet 138 by the tool or tools 109 closest thereto, that is, the rearmost tool or tools, there is provided an elongated plate 141 (see Figs. 5 and 7) which is secured along its length to an inner part of the casing 16 below the lower cuter head 98 and inclined along its width toward a side wall of said casing to serve as a trough, there being discharge openings 142 in said side wall through which chips and shavings may either fall or be removed from said trough. The casing 16 is formed with openings 143 spaced longitudinally thereof and directly below the lower cutter head 98 in communication with the trough formed by the plate 141, and in communication with said openings are other openings 144 which are formed in said lower cutter head intermediate the cutters 109 carried thereby. Therefore, any chips or shavings not picked up by the movable members 140 pass through the cutter head openings 144, into and through the casings 143, into the trough formed by the plate 141, and outwardly through the wall openings 142. For particularly protecting the central mechanism, that is, the worms 66 and worm gears 67, from falling chips and shavings there is provided a shield 145 which overlies said mechanism and is secured to the casing 16.

Although the invention has been described with some detail it is to be understood that the description is not definitive of the limits of the inventive idea. The right is reserved to make such changes in the details of construction and arrangement of parts as will come within the purview of the attached claims.

What I claim is:

1. In a machine of the character described, a pair of work supports operable for receiving a work piece therebetween, means operable for moving said supports relatively one to the other into clamping position with respect to the work piece and also into a position spaced from said first position, and supporting means arranged on one side of the work piece and operable responsive to movement of said supports from said first position toward said second position for bodily moving the work piece into a position spaced from each of said supports.

2. In a machine of the character described, a pair of work supports operable for receiving a work piece therebetween, means operable for moving said supports relatively one to the other into clamping position with respect to the work piece and also into a position spaced from said first position, means arranged on one side of the work piece, and means operatively interconnecting said support and said second means and responsive to movement of said supports from said first position toward said second position for effectuating movement by said second means of the work piece into a position spaced from each of said supports.

3. In a machine of the character described, a pair of work supports operable for receiving a work piece therebetween, means operable for moving said supports relatively one to the other into clamping position with respect to the work piece and also into a position spaced from said first position, linkage means interconnecting said supports, and means carried by said second means and operable responsive to movement of said supports from said first position toward said second position for bodily moving the work piece into a position spaced from each of said supports.

4. In a machine of the character described, a pair of work supports operable for receiving a work piece therebetween, means operable for moving said supports relatively one to the other into clamping position with respect to the work piece and also into a position spaced from said first position, linkage means having portions pivotally conected to each other to said supports, and means carried by said second means on one side of the work piece and operable responsive to movement of said supports from said first position toward said second position for bodily moving the work piece into a position spaced from each of said supports.

5. In a machine of the character described, a base, a pair of work supports mounted one above the other on said base for movement relatively one to the other toward and from each other and operable for receiving therebetween a work sheet having a flash portion extending horizontally along a predetermined path, at least one of said supports carrying flash-removing means movable therewith and also relatively thereto horizontally along a path substantially parallel with said first path, means selectively operable for unitarily moving said supports along a path normal to said first and second paths relatively to the work sheet to eliminate horizontal spacing between the flash-removing means and flash portion, and other means selectively operable for unitarily moving said supports about a vertical axis relatively to the work sheet to eliminate arcuate spacing between the flash-removing means and flash portion.

6. In a machine of the character described, a work supporting structure, a base for supporting said structure, a pair of drive shafts supported by said base against axial movement relatively thereto, said shafts being formed one with a splined portion and the other with a screw portion, means operatively connected to said shafts for individually rotating same about their respective axes, and means operatively interconnecting said portions and said structure for rectilinearly moving the latter relatively to said base along a given horizontal path during rotation of one of said shafts and for pivotally moving said structure relatively to said base about a given vertical axis during rotation of the other of said shafts.

7. In a machine of the character described, a work supporting structure, a base for supporting said structure, a pair of drive shafts supported in substantial parallelism by said base against axial movement relatively thereto and each being formed with a splined portion, means for unitarily rotating said shafts about the axes thereof, a second pair of shafts also supported in substantial parallelism by said base against axial movement relatively thereto and each being formed with a screw portion, means operable independently of said first means for unitarily rotating said latter shafts about the axes thereof, and means operatively interconnecting said structure, said splined portions and said screw portions for rectilinearly moving said structure relatively to said base in the direction of said axes during rotation of one of said pairs of shafts and for pivotally moving said structure relatively to said base about a vertical axis during rotation of the other of said pairs of shafts.

8. In a machine of the character described, a pair of elongated supports arranged one above the other and movable relatively toward and from each other, a pair of transversely spaced clamping members fixed to the upper support and extending in the direction of the length thereof, a like pair of transversely spaced clamping members fixed to the lower support in parallelism with and opposed relationship to the upper pair of said members, a chamber formed in said upper support and carrying on the front and rear walls thereof two series of rollers longitudinally spaced from each other and rotatable about axes residing in a common horizontal plane, a like chamber formed in said lower support and also carrying on the front and rear walls thereof two like series of rollers spaced and rotatable similarly as said first rollers, a pair of elongated tool carriers slotted along their lengths on the front and rear sides thereof for being received one between said first two series of rollers and supported thereupon and the other between said second two series of rollers and supported thereupon, said tool carriers fixedly supporting tools extending toward each other and through the spaces between said two pairs of clamping members, and means operable for unitarily reciprocating said carriers relatively to said supports.

9. In a machine of the character described, a pair of elongated supports arranged one above the other and movable relatively toward and from each other, a pair of transversely spaced clamping members fixed to the upper support and extending in the direction of the length thereof, a like pair of transversely spaced clamping members fixed to the lower support in parallelism with and opposed relationship to the upper pair of said members, said pairs of clamping members being operable for supporting therebetween a work sheet having a flash portion residing in the spacing between said members of said first pair and in the spacing between said members of said second pair, a chamber formed in said upper support and carrying on the front and rear walls thereof two series of rollers longitudinally spaced from each other and rotatable about axes residing in a common horizontal plane, a like chamber formed in said lower support and also carrying on the front and rear walls thereof two like series of rollers spaced and rotatable similarly as said first rollers, a pair of elongated tool carriers slotted along their lengths on the front and rear sides thereof for being received one between said first two series of rollers and supported thereupon and the other between said second two series of rollers and supported thereupon, said tool carriers fixedly supporting tools extending toward each other from said chambers for cooperation with and removal of said flash portion, means operable for unitarily reciprocating said carriers relatively to said supports to effectuate removal of said flash portion from the work sheet by said tools, and means operable responsive to the operation of said last mentioned means for controlling the deposition of said flash portion so removed.

10. In a machine of the character described, a pair of work supports operable for receiving a work piece therebetween, a pair of carriers each operable for carrying one of said supports, actuatable means associable with one of said carriers and movable in one direction to effectuate movement of said one carrier away from the other of said carriers and in another direction to effectuate movement of said one carrier toward said other carrier, whereby said supports are moved, respectively, out of and into clamping engagement with the work piece, and means supported by said one carrier on one side of the work piece and operable during and responsive to movement of said one carrier away from said other carrier for positioning the work piece from each of said supports.

11. In a machine of the character described, a pair of work supports operable for receiving a work piece therebetween, a pair of carriers each operable for carrying one of said supports, means movable in opposite directions and having a positive connection with one of said carriers during movement in one of said directions for moving said one carrier positively away from the other of said carriers and having a flexible connection with said one carrier during movement in the other of said directions for moving said one carrier yieldably toward said other carrier, whereby said supports are moved positively out of and yieldably into, respectively, clamping engagement with the work piece, and means supported by said one carrier on one side of the work piece and operable during and responsive to movement of said one carrier away from said other carrier for positioning the work piece from each of said supports.

HENRY EARL MORTON.